US011020850B2

(12) United States Patent
Bilodeau et al.

(10) Patent No.: US 11,020,850 B2
(45) Date of Patent: Jun. 1, 2021

(54) LINKING DEVICE FOR AN EXOSKELETON STRUCTURE FACILITATING THE CARRYING OF LOADS WHILE WALKING OR RUNNING

(71) Applicants: SAFRAN ELECTRONICS & DEFENSE, Boulogne-Billancourt (FR); B-TEMIA INC., Québec (CA)

(72) Inventors: Katia Bilodeau, Quebec (CA); Francisco Soucy, Quebec (CA); Nathaniel Zoso, Quebec (CA); Jonathan Baptista, Boulogne-Billancourt (FR); Jordane Grenier, Boulogne-Billancourt (FR)

(73) Assignees: SAFRAN ELECTRONICS & DEFENSE, Boulogne-Billancourt (FR); B-TEMIA INC., Québec (CA)

( * ) Notice: Subject to any disclaimer, the term of this patent is extended or adjusted under 35 U.S.C. 154(b) by 98 days.

(21) Appl. No.: 16/474,858

(22) PCT Filed: Dec. 28, 2017

(86) PCT No.: PCT/EP2017/084744
§ 371 (c)(1),
(2) Date: Jun. 28, 2019

(87) PCT Pub. No.: WO2018/122332
PCT Pub. Date: Jul. 5, 2018

(65) Prior Publication Data
US 2020/0406449 A1 Dec. 31, 2020

(30) Foreign Application Priority Data
Dec. 29, 2016 (FR) ...................................... 1663512

(51) Int. Cl.
*A61H 3/00* (2006.01)
*B25J 9/00* (2006.01)
(Continued)

(52) U.S. Cl.
CPC .......... *B25J 9/0006* (2013.01); *A61H 1/0262* (2013.01); *A61H 1/0292* (2013.01);
(Continued)

(58) Field of Classification Search
CPC ...... A61H 1/0262; A61H 1/0292; A61H 3/00; A61H 2003/007; A61H 2201/163; B25J 9/0006; B25J 9/104; F16H 19/06
See application file for complete search history.

(56) References Cited

U.S. PATENT DOCUMENTS

2006/0260620 A1 11/2006 Kazerooni et al.
2007/0123997 A1* 5/2007 Herr .......................... A61F 2/70
623/27

(Continued)

FOREIGN PATENT DOCUMENTS

JP 2015-163180 A 9/2015

OTHER PUBLICATIONS

Communication dated Oct. 16, 2017 from French Patent Office in counterpart FR Application No. 1663512.
(Continued)

*Primary Examiner* — Timothy A Stanis
(74) *Attorney, Agent, or Firm* — Sughrue Mion, PLLC

(57) ABSTRACT

A linking device for an exoskeleton structure is provided. The device an input part mounted in rotation with respect to a support, and a transmission device that when a load is applied to the input part to pivot the input part in a first direction of rotation, the transmission device transmits to a first connecting link a force to pivot the first connecting link to transfer the load to a first mechanical leg assembly and
(Continued)

Figure 1:
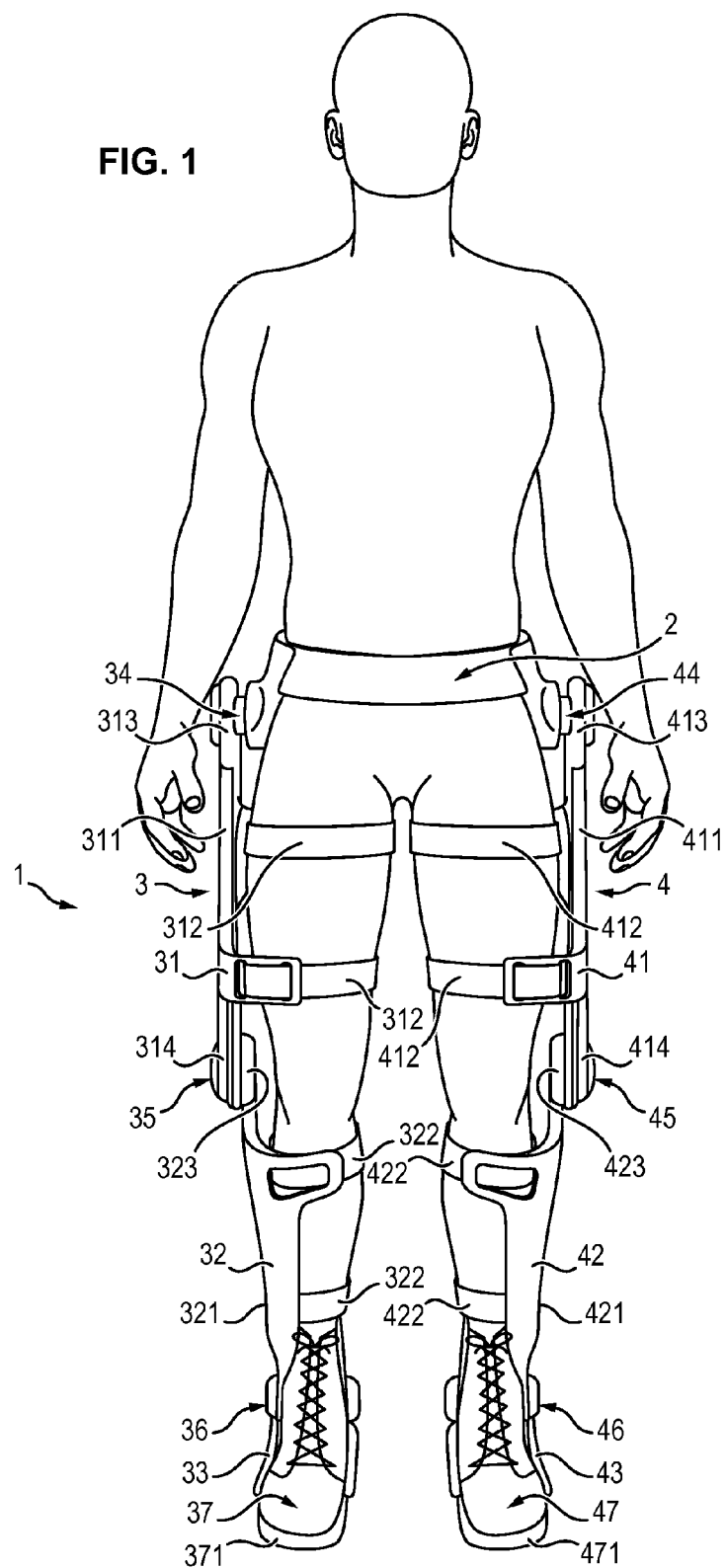

unload a second mechanical leg assembly of the exoskeleton structure, and when a load is applied to the input part to pivot the input part in a second direction of rotation opposite to the first direction, the transmission device transmits to a second connecting link a force to pivot the second connecting link to transfer the load to a second mechanical leg assembly and unload the first mechanical leg assembly.

15 Claims, 6 Drawing Sheets

(51) Int. Cl.
    *A61H 1/02*     (2006.01)
    *B25J 9/10*     (2006.01)
    *F16H 19/06*     (2006.01)

(52) U.S. Cl.
    CPC ................ *A61H 3/00* (2013.01); *B25J 9/104* (2013.01); *F16H 19/06* (2013.01); *A61H 2003/007* (2013.01); *A61H 2201/163* (2013.01)

(56) References Cited

U.S. PATENT DOCUMENTS

| | | | |
|---|---|---|---|
| 2011/0264014 A1* | 10/2011 | Angold | B25J 9/0006 601/35 |
| 2011/0266323 A1* | 11/2011 | Kazerooni | B25J 9/0006 224/575 |
| 2013/0303950 A1* | 11/2013 | Angold | A61H 3/00 601/35 |
| 2016/0023350 A1* | 1/2016 | Holgate | A45F 3/00 248/550 |
| 2016/0317340 A1 | 11/2016 | Jangir | |

OTHER PUBLICATIONS

International Search Report for PCT/EP2017/084744, dated Jun. 28, 2018.

* cited by examiner

LINKING DEVICE FOR AN EXOSKELETON STRUCTURE FACILITATING THE CARRYING OF LOADS WHILE WALKING OR RUNNING

This application is a National Stage of International Application No. PCT/EP2017/084744 filed Dec. 28, 2017, claiming priority based on French Patent Application No. 1663512 filed Dec. 29, 2016, the entire contents of each of which are herein incorporated by reference in their entireties.

FIELD OF THE INVENTION

The invention relates to a linking device for an exoskeleton structure, and an exoskeleton structure comprising a device of this type.

PRIOR ART

In the military field, infantrymen are currently equipped with backpacks allowing them to transport equipment. When the infantrymen are carrying out prolonged missions, the mass of the backpack can reach 50 kilograms. The mass of the backpack can strongly reduce the mobility of the infantryman and cause a greater metabolic output.

Moreover, the backpack generally rests on the shoulders or on the hips of the user, which can generate muscular-skeletal problems at the shoulders, skin pressure, or be the source of neurological symptoms due to nerve compression (tingling sensations).

Current solutions consist of distributing the mass of the backpack both on the shoulders by means of straps and on the hips by means of a ventral belt. These solutions do not however allow the user to be completely relieved.

Exoskeletons for force assistance are mechanical structures which duplicate the structure of the human skeleton and which allow an improvement in the physical capacities of the human body.

Certain exoskeleton structures have been proposed which allow the mass of the backpack to rest on the ground.

However, known exoskeleton structures (sometimes called "walking robots") generate very significant bulk and reduce the mobility of the user.

In particular, in these exoskeleton structures, the load of the backpack rests on the lower portions of the exoskeleton, which extend along the legs of the user to the ground. This load consequently has a tendency to oppose the movements of the feet of the user when walking, in particular when the user moves his foot off the ground.

SUMMARY OF THE INVENTION

One aim of the invention is to propose a solution to allow a user to be relieved of a considerably portion of the mass of his backpack, without however reducing the mobility of the lower part of his body during walking or running.

This goal is achieved within the scope of the present invention thanks to a linking device for an exoskeleton structure, comprising:
a support intended to be attached to a lumbar belt,
an input part mounted in rotation with respect to the support and capable of being connected to a mechanical back assembly of the exoskeleton structure,
a transmission device,
a first connecting link mounted in rotation with respect to the support, the first connecting link having a first end connected to the input part by means of the transmission device and a second end capable of being connected to a first hip joint of a first mechanical leg assembly of the exoskeleton structure and
a second connecting link mounted in rotation with respect to the support, the second connecting link having a first end connected to the input part by means of the transmission device and a second end capable of being connected to a second hip joint of a second mechanical leg assembly of the exoskeleton structure,
the transmission device being arranged so that:
when a load is applied to the input part tending to pivot the input part in a first direction of rotation with respect to the support, the transmission device transmits to the first connecting link a force tending to pivot the first connecting link around its axis to transfer the load to the first mechanical leg assembly and unload the second mechanical leg assembly of the exoskeleton structure and
when a load is applied to the input part tending to pivot the input part in a second direction of rotation, opposite to the first direction of rotation, the transmission device transmits to the second connecting link a force tending to pivot the second connecting link around its axis to transfer the load to the second mechanical leg assembly and unload the first mechanical leg assembly of the exoskeleton structure.

During the walking cycle, the mechanical leg assemblies of the exoskeleton structure are alternately in contact with the ground. The proposed linking device allows the load generated by the weight of the backpack to be transferred to the mechanical leg assembly in contact with the ground and to relieve the mechanical leg assembly which is not in contact with the ground.

More precisely, for each mechanical leg assembly:
during the stance phase, which corresponds to a period where the foot is in contact with the ground, the load is transmitted to the ground by the mechanical leg assembly, and
during the oscillating phase, when the foot is no longer in contact with the ground, the mechanical leg assembly is free of any load generated by the backpack, so that the oscillating foot moves freely.

Moreover, when the user is standing immobile, the mechanical leg assemblies of the exoskeleton structure are in contact with the ground simultaneously. The proposed linking device allows sharing the load generated by the backpack by distributing it over both mechanical leg assemblies.

The linking device can also have the following features:
the input part is mounted sliding with respect to the support,
the input part is mounted sliding with respect to the support by means of a slider and of a cylindrical pin capable of sliding inside the slider and turning with respect to the slider,
the input part has a first branch having one end connected to the first connecting link by means of the transmission device and a second branch having one end connected to the second connecting link by means of the transmission device,
the transmission device is a pulley and cable device,
the transmission device comprises a first cable connecting the input part to the first end of the first connecting link, and a second cable connecting the input part to the first end of the second connecting link, the device comprises a first pulley mounted in rotation on the support, and in which the first cable connects the input part to the first end of the first connecting link while supporting itself on a circumferential surface of the first pulley, the device comprises a second pulley mounted in rotation on the support, and in which the second cable connects the input part to the first end of the second connecting link while supporting itself on a circumferential surface of the second pulley, the first pulley and the second pulley have their axes of rotation coincident, the transmission device comprises a first pulley mounted in rotation on the support, a first cable connecting the input part to the first pulley, and a third cable connecting the first pulley to the first end of the first connecting link, the first cable supports itself on a first circumferential surface of the first pulley and the third cable supports itself on a third circumferential surface of the first pulley, the third circumferential surface having a smaller radius than the radius of the first circumferential surface, the transmission device comprises a second pulley mounted in rotation on the support, a second cable connecting the input part to the second pulley, and a fourth cable connecting the second pulley to the first end of the second connecting link, the second cable supports itself on a second circumferential surface of the second pulley and the fourth cable supports itself on a fourth circumferential surface of the second pulley, the fourth circumferential surface having a smaller radius than the radius of the second circumferential surface, the first pulley and/or the second pulley has an axis of rotation coincident with the axis of rotation of the first connecting link and/or of the second connecting link.

The invention also relates to an exoskeleton structure comprising:

a lumbar belt capable of surrounding the waist of a user, a first mechanical leg assembly capable of extending along a first leg of the user, a second mechanical leg assembly capable of extending along a second leg of the user, a mechanical back assembly capable of extending along the back of the user for carrying a load, a lining device as previously defined, of which the input part is connected to the back structure, the support is attached to the lumbar belt, the first connecting link has its second end connected to the first mechanical leg assembly via a first hip joint and the second connecting link has its second end connected to the second mechanical leg assembly via a second hip joint.

PRESENTATION OF THE DRAWINGS

Figure 2:
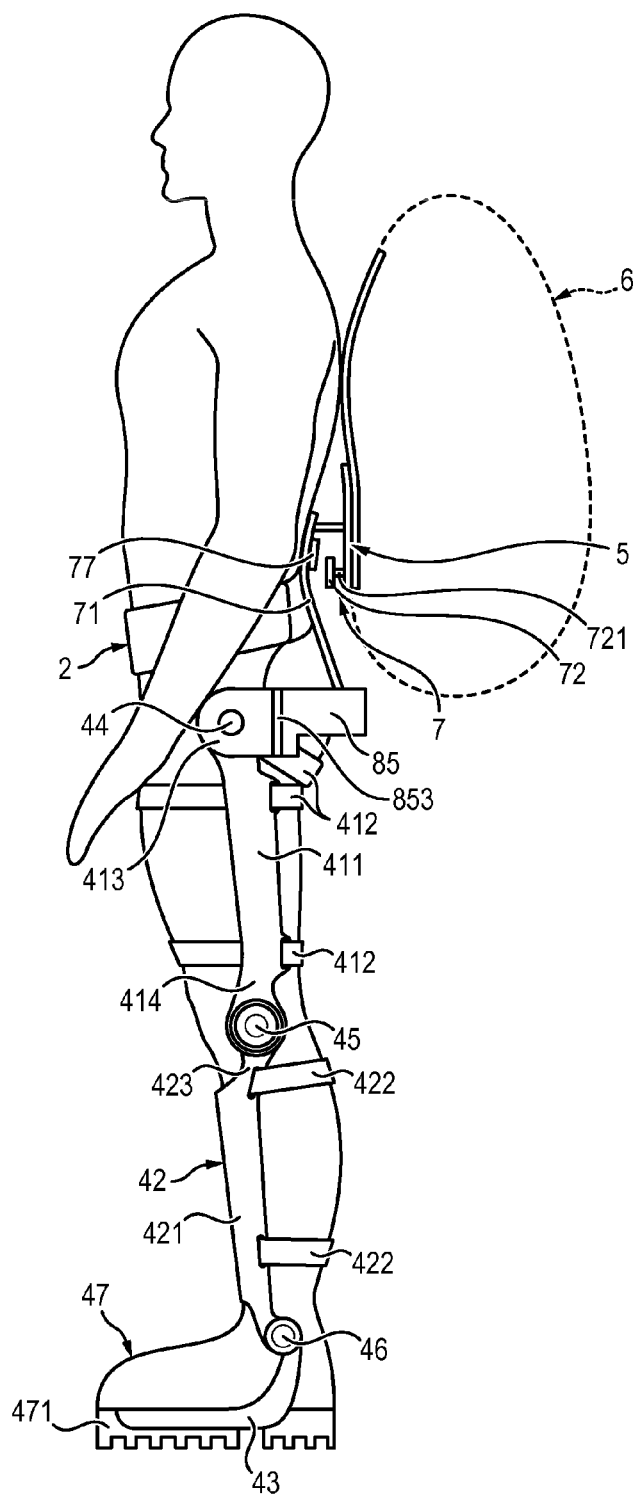
Figure 3:
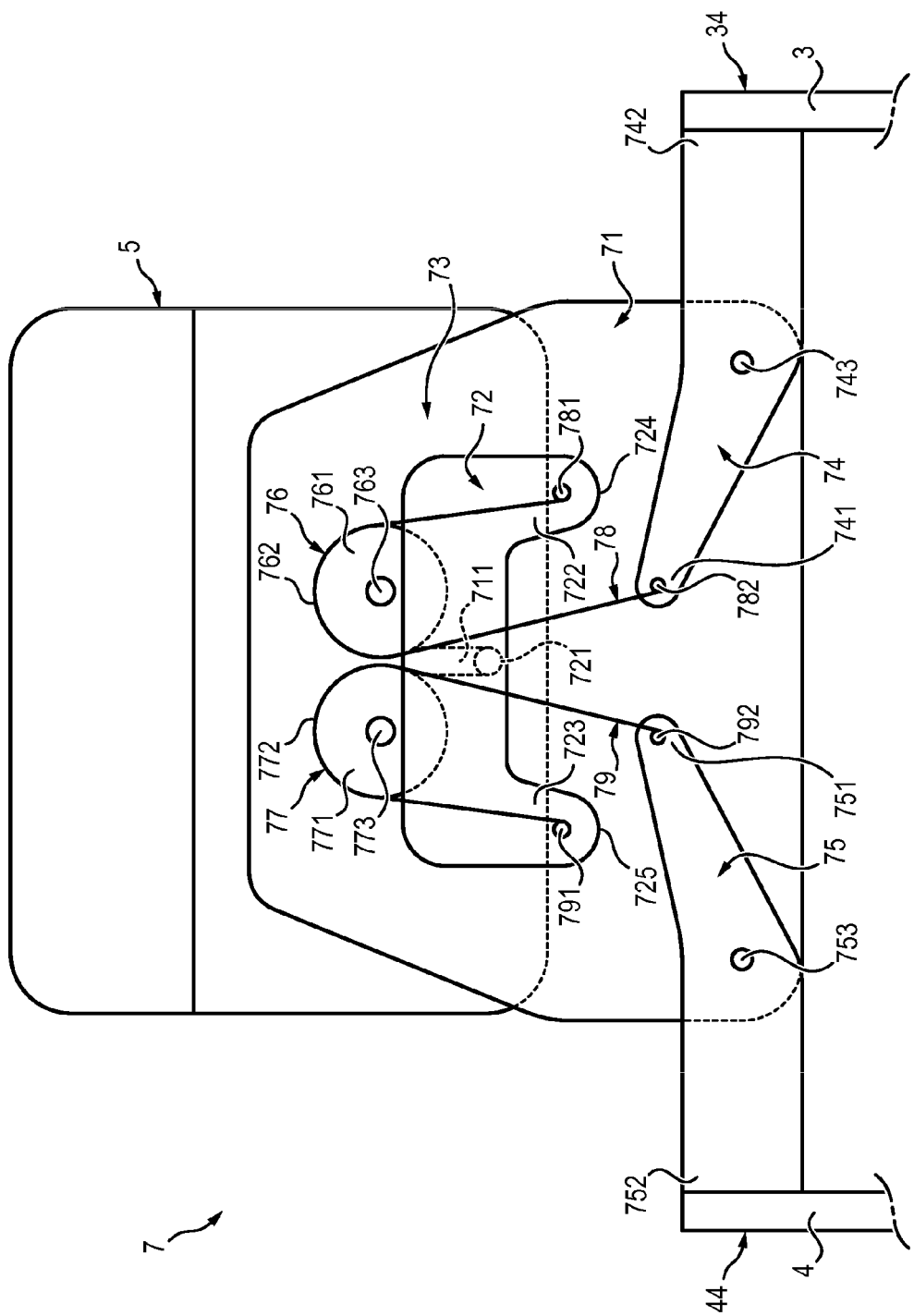
Figure 4:
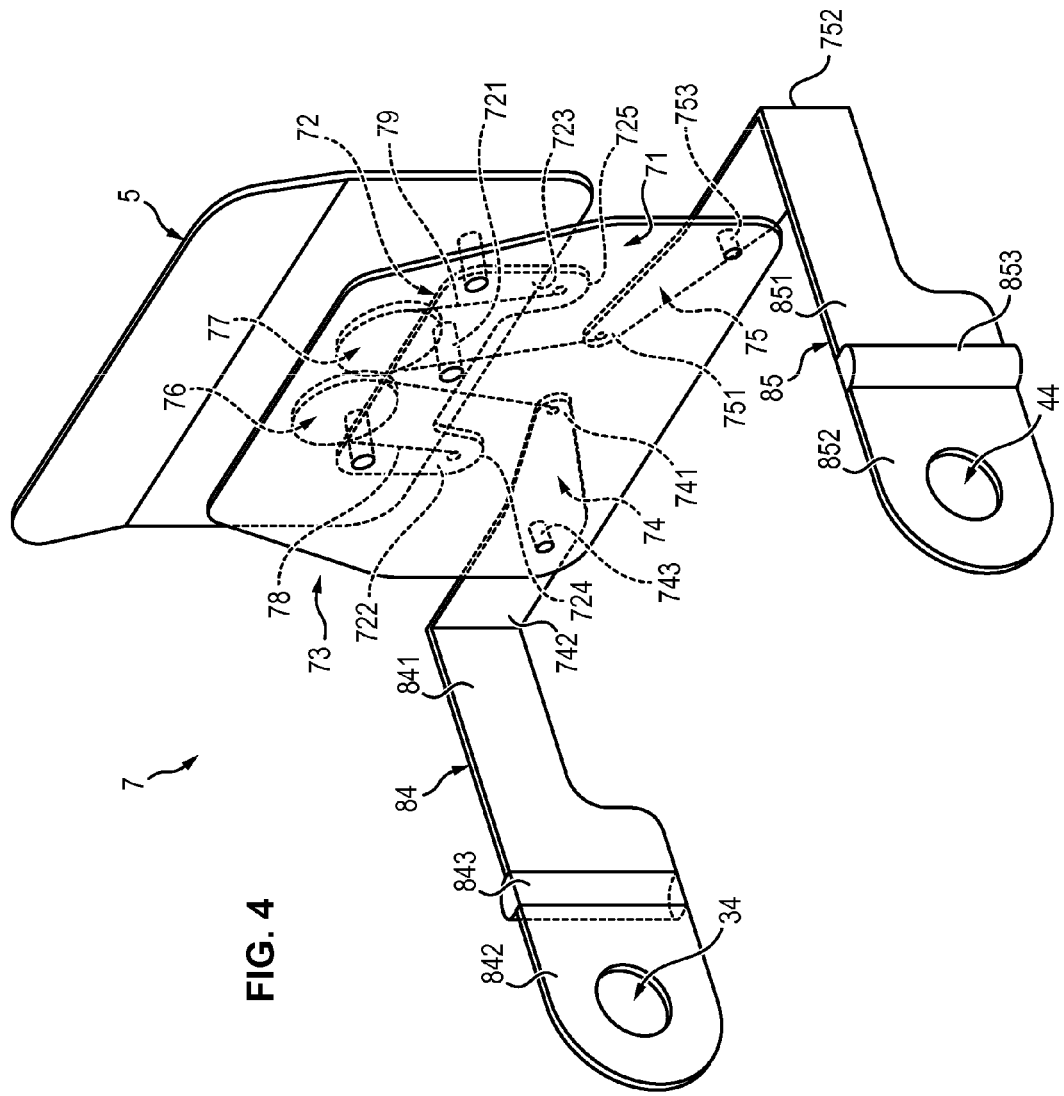
Figure 5:
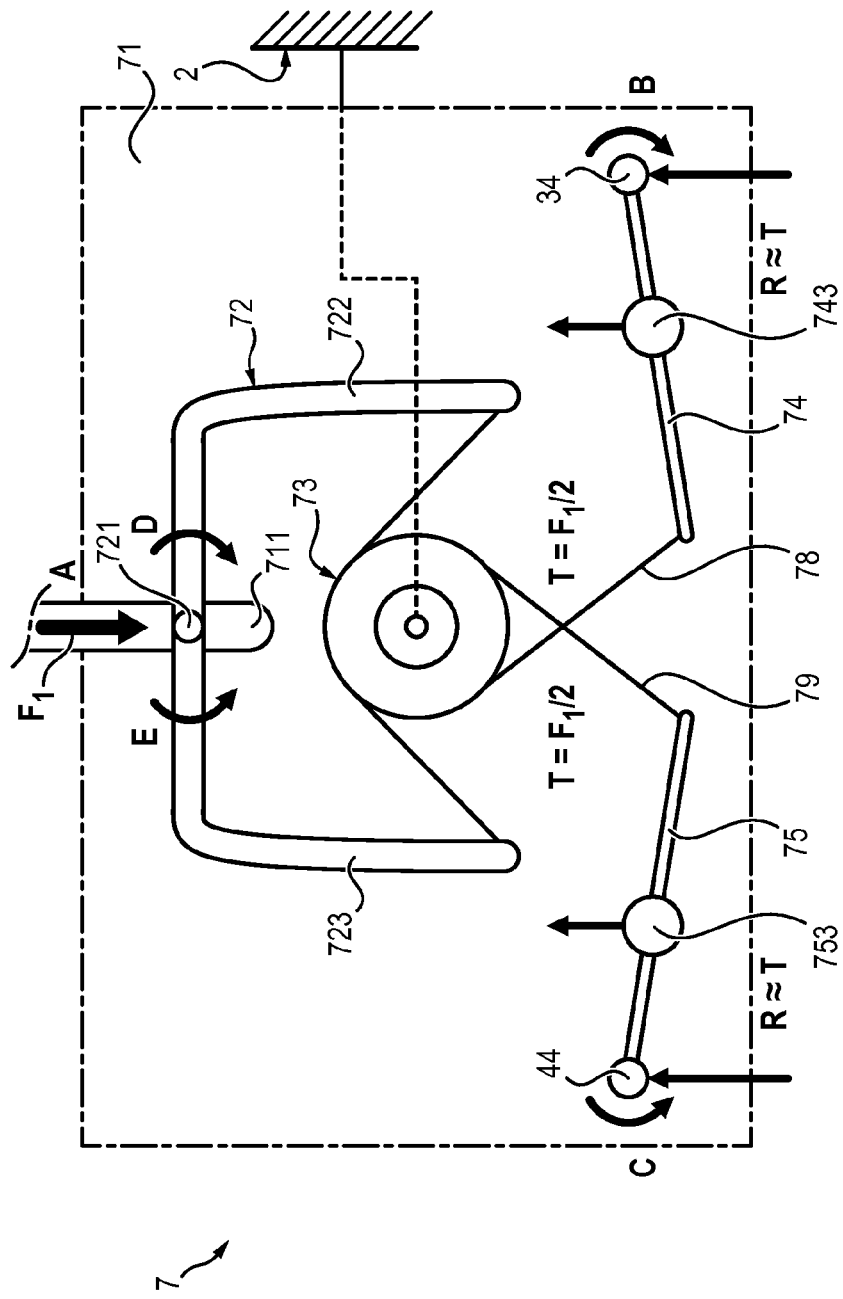
Figure 6:
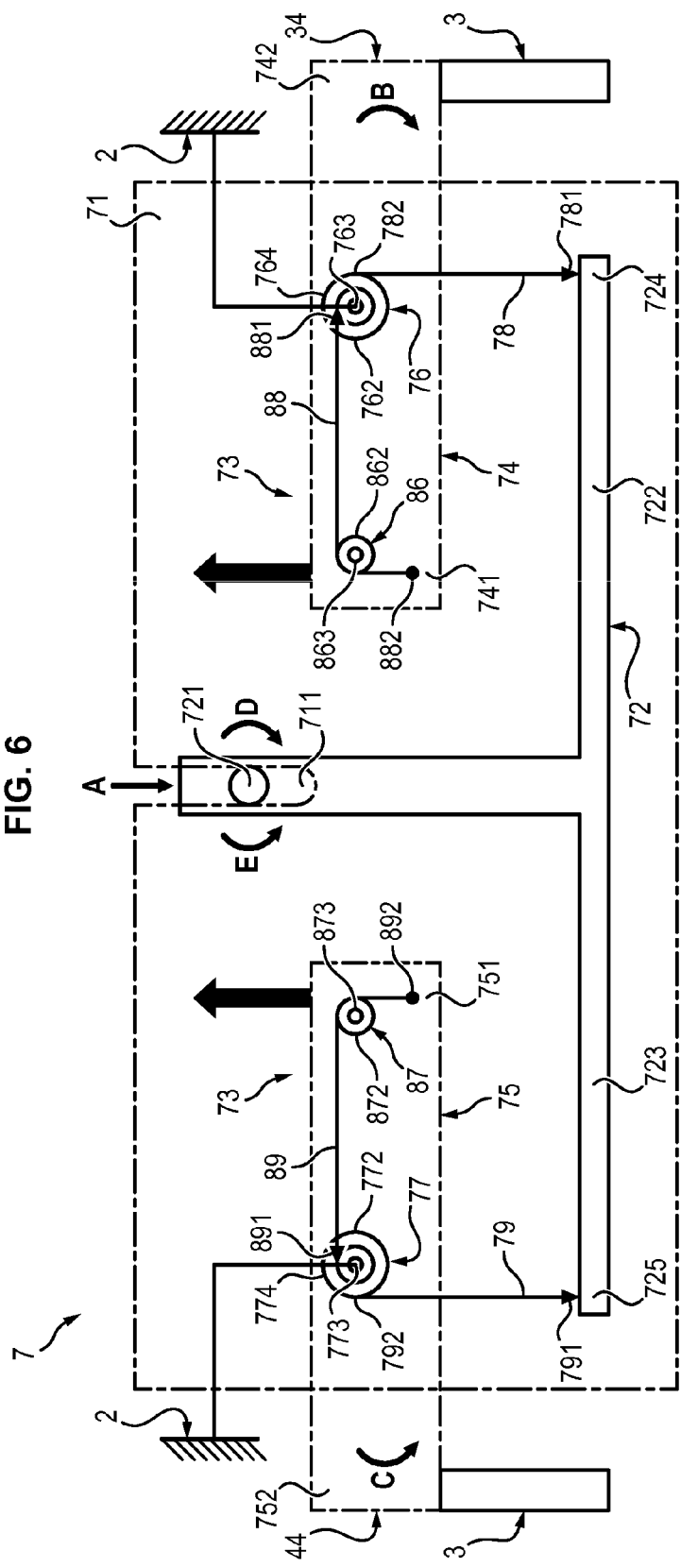

Other features and advantages will still be revealed by the description that follows, which is purely illustrative and not limiting, and must be read with reference to the appended drawings, among which:

FIG. 1 shows schematically in front view an exoskeleton structure conforming to one embodiment of the invention, FIG. 2 shows schematically, in side view, the exoskeleton structure of FIG. 1, FIGS. 3 and 4 show schematically a linking device conforming to a first embodiment of the invention, FIG. 5 is an outline schematic illustrating the operation of the linking device of FIGS. 3 and 4, FIG. 6 shows schematically a linking device conforming to a second embodiment of the invention.

DETAILED DESCRIPTION OF ONE EMBODIMENT

In FIGS. 1 and 2, the exoskeleton structure comprises a lumbar belt 2, a first mechanical leg assembly 3, a second mechanical leg assembly 4, and a mechanical back assembly 5.

The lumbar belt 2 is capable of surrounding the waist of the user. The lumbar belt 2 is disposed around the waist of the user, supported on the hips of the user. The lumbar belt can support a battery allowing the different actuators of the exoskeleton structure to be supplied with electrical power, and a control unit programmed to control the different actuators. The battery and the and the control unit are attached to the lumbar belt.

The first mechanical leg assembly 3 extends along a first lower member (right leg) of the user. The first mechanical leg assembly 3 is capable of being attached to the first lower member to assist movement of the first lower member during walking or running.

The second mechanical leg assembly 4 extends along a second lower member (left leg) of the user. The second mechanical leg assembly 4 is capable of being attached to the second lower member to assist movement of the second lower member during walking or running.

It will be noted that the first mechanical leg 3 assembly and the second mechanical leg assembly 4 are symmetrical to one another. These assemblies 3 and 4 therefore comprise identical or similar portions.

The first mechanical assembly 3 comprises a first femoral part 31, a first tibial part 32, and a first foot part 33.

The first femoral part 31 comprises a first femoral segment 311 intended to extend along a first thigh (right thigh) of the user and attachment straps 312 capable of surrounding the first thigh of the user to attach the femoral segment 311 to the first thigh.

The first tibial part 32 comprises a first tibial segment 321 intended to extend along a first shin (right shin) of the user and attachment straps 322 capable of surrounding the first shin of the user to attach the tibial segment 321 to the first shin.

The first foot part 33 is attached to a first shoe 35 of the user, to a sole 351 of the shoe 37 for example. The first foot part 33 can be attached to the sole 371 by means of screws.

The first femoral segment 311 comprises a first end 313 connected to the lumbar belt 2 by means of a first hip joint 34 and a second end 314 connected to the first tibial segment 321 by means of a first knee joint 35.

The first tibial segment 321 comprises a first end 323 connected to the first femoral segment 311 by the first knee joint 35 and a second end 324 connected to the first foot part 33 by means of a first ankle joint 36.

The second mechanical assembly 4 is symmetrical with the first mechanical assembly 3.

The second mechanical assembly 4 also comprises a second femoral part 41, a second tibial part 42 and a second foot part 43.

The second femoral part 41 comprises a second femoral segment 411 intended to extend along a second thigh (left thigh) of the user and attachment straps 412 capable of surrounding the second thigh of the user to attach the femoral segment 411 to the second thigh.

The second tibial part 42 comprises a second tibial segment 421 intended to extend along the second calf (left calf) of the user and attachment straps 422 capable of surrounding the second calf of the user to attach the tibial segment 421 to the second calf.

The second foot part 43 is attached to a second shoe 47 of the user, for example to a sole 471 of the shoe 47. The second foot part 43 can be fixed to the sole 471 by means of screws.

The second femoral segment 411 comprises a first end 413 connected to the lumbar belt 2 by means of a second hip joint 44 and a second end 414 connected to the second tibial segment 421 by means of a second knee joint 45.

The second tibial segment 421 comprises a first end 423 connected to the second femoral segment 411 by the second knee joint 45 and a second end 424 connected to the second foot part 43 by means of a second ankle joint 46.

The hip joints 34, 44 and the knee joints 35, 45 can include actuators allowing assistance to the user during a flexure or extension movement of the hip or of the knee.

The mechanical back assembly 5 (visible in FIG. 2) is capable of extending along the back of the user for carrying a load 6, for example a backpack.

The exoskeleton structure 1 also comprises a linking device 7 allowing the mechanical back assembly 5 to be connected to the lumbar belt 1 and to the mechanical leg assemblies 3 and 4.

When the load 6 is attached to the mechanical back assembly 5, the load 6 is transferred to the ground, via the lumbar belt 2 and the mechanical leg assemblies 3 and 4.

FIGS. 3 and 4 show schematically a linking device 7 conforming to a first embodiment, connecting the mechanical back assembly 5 to the lumbar belt 2 and to the mechanical leg assemblies 3 and 4.

The linking device 7 comprises a support 71, an input part 72, a transmission device 73, a first connecting link 74 and a second connecting link 75.

The support 71 is attached to the lumbar belt 2.

The input part 72 is connected to the mechanical back assembly 5. The input part 72 is mounted sliding with respect to the support 71 by means of a slider 711 and of a cylindrical pin 721 capable of sliding inside the slider 711 and turning with respect to the slider 711. More precisely, the pin 721 is mounted fixedly on the input part 72 and the slider 711 is mounted fixedly on the support 71. The pin 721 and the slider 711 thus allow translation of the input part 72 with respect to the support 71 in a substantially vertical direction when the user holds himself in a standing position. The pin 721 and the slider 711 also allow rotation of the input part 72 with respect to the support 71 along an axis of rotation parallel to the sagittal axis of the user.

The input part 72 has the general shape of a U with a first branch 722 and a second branch 723. The first branch 722 has a first end 724 and the second branch 723 has a second end 725.

The transmission device 73 comprises a first pulley 76, a second pulley 77, a first cable 78 and a second cable 79.

The first pulley 76 is mounted in rotation on the support 71 around a first axis of rotation 763. The first pulley 76 comprises a first wheel 761 having a first circumferential surface 762. The first circumferential surface 762 can have a first recess for receiving and guiding the first cable 78.

The second pulley 77 is also mounted in rotation on the support 71 around a second axis of rotation 773. The second pulley 77 comprises a second wheel 771 having a second circumferential surface 772. The second circumferential surface 772 can have a second recess for receiving and guiding the second cable 79.

The two pulleys 76 and 77 can be disposed side by side and having distinct and parallel axes of rotation 763 and 773, or be disposed by being superimposed while having their axes of rotation 763 and 773 coincident.

The first connecting link 74 is mounted in rotation on the support 71. Preferably, the first connecting link 74 is mounted in rotation around an axis of rotation 743 coincident with an adduction/abduction axis of the first hip joint (right hip joint) of the user. The first connecting link 74 has a first end 741 connected to the input part 72 by means of the transmission device 73 and a second end 742 connected to the first hip joint 34 of the first mechanical leg assembly 3.

The second connecting rod 75 is mounted in rotation with respect to the support 71. Preferably the second connecting link 75 is mounted in rotation around an axis of rotation 753, parallel to the axis of rotation 743 of the first connecting link 74, and coincident with an adduction/abduction axis of the second hip joint (left hip joint) of the user. The second connecting link 75 has a first end 751 connected to the input part 72 by means of the transmission device 73 and a second end 752 connected to the second hip joint 44 of the second mechanical leg assembly 4.

The first cable 78 connects the input part 72 to the first connecting link 74, supporting itself on the circumferential surface 762 of the first pulley 76. More precisely, the first cable 78 has a first end 781 attached to the first end 724 of the input part 72 and a second end 782 attached to the first end 741 of the first connecting link 74.

Likewise, the second cable 79 connects the input part 72 to the second connecting link 75, supporting itself on the circumferential surface 771 of the second pulley 77. More precisely, the second cable 79 has a first end 791 attached to the second end 725 of the input part 72 and a second end 792 attached to the first end 751 of the second connecting link 75.

Moreover, as can be seen in FIG. 4, each connecting link 74, 75 can be connected to a respective mechanical leg assembly 3, 4 by means of articulated segments 84, 85. More precisely, the first segment 84 comprises two segment portions 841 and 843 articulated by means of a pivot connection 843 allowing rotation of the segment portions with respect to one another around a vertical axis. Likewise, the second segment 85 comprises two segment portions 851 and 852 articulate by means of a pivot connection 853 allowing rotation of the segment portions with respect to one another around a vertical axis. The pivot connections 843 and 853 allow the accommodation of internal and external rotation movements of the hips of the user.

FIG. 5 illustrates the operating principle of the linking device 7.

The linking device 7 operates in the following manner.

When the user is standing supported on both his legs, in a static position, the weight of the load 6 supported by the mechanical back assembly 5 is transmitted to the input part 72 (arrow A). the weight has the effect of placing in tension the first cable 78 and the second cable 79. The tension exerted on the first cable 78 is identical to the tension exerted on the second cable 79. This tension is equal to half of the load.

This has the consequence that the first cable 78 exerts on the first connecting link 74 a first force tending to pivot the first connecting link 74 in a first direction of rotation (arrow B).

Likewise, the second cable 79 exerts on the second connecting link 75 a second force tending to pivot the second connecting link 75 in a second direction of rotation (arrow C), opposite to the first direction of rotation.

The first connecting link 74 thus transmits a first force to the first mechanical leg assembly 3 and the second connecting link 75 transmits a second force to the second mechanical leg assembly 4. The first force is identical to the second force, so that the two mechanical leg assemblies 3 and 4 support an identical supporting force, equal to half of the load.

While the user is walking, the user supports himself alternately on his first leg (right leg) and on his second leg (left leg), which causes a slight oscillation of the input part 72 around its axis of rotation.

During a first phase of the walking cycle, when the user is supported on his first leg, the input part 72 has a tendency to pivot with respect to the support part 71, in a first direction of rotation (arrow D) around its axis of rotation.

Rotation of the input part 72 in the first direction has the effect of extending the first cable 78 and relaxing the second cable 79. In other words, the tension in the first cable 78 becomes greater than the tension in the second cable 79. The first 78 transmits to the first connecting link 74 a force tending to pivot the first connecting link 74 with respect to the support part 71 in the first direction of rotation (arrow B) around its axis of rotation 743. This has the effect that the totality of the load exerted on the mechanical back assembly 5 is transferred by the first connecting link 74 to the first mechanical leg assembly 3 via the first hip joint 34.

Conversely, the fraction of the load transmitted to the second mechanical leg assembly 4 is strongly reduced, which allows the user to be able to lift his second leg from the ground without exerting excessive force.

During a second phase of the walking cycle, when the user support himself on his second leg, the input part 72 has a tendency to pivot with respect to the support part 71 in a second direction of rotation (arrow E) around its axis of rotation, the second direction of rotation being opposite to the first direction of rotation.

Rotation of the input part 72 in the second direction has the effect of extending the second cable 79 and relaxing the first cable 78. In other words, the tension in the second cable 79 becomes greater than the tension in the first cable 78. The second cable 79 transmits to the second connecting link 75 a force tending to pivot the second connecting link 75 with respect to the support part 71 in the second direction of rotation (arrow C) around its axis of rotation 753. This has the effect that the totality of the load exerted on the mechanical back assembly 5 is transferred by the second connecting link 75 to the second mechanical leg assembly 4 via the second hip joint 44.

Conversely, the fraction of the load transmitted to the first mechanical leg assembly 3 is strongly reduced, which allows the user to be able to lift is first leg from the ground without excessive force.

During the walking cycle, the load is thus transferred alternately to the first mechanical leg assembly 3 and to the second mechanical leg assembly 4. Thanks to the proposed linking device, the load is always transferred to the mechanical leg assembly 3 or 4 which is in contact with the ground. The other mechanical leg assembly only supports a reduced fraction of the load so that the user can easily lift the corresponding leg.

FIG. 6 shows schematically a linking device 7 conforming to a second embodiment.

Just as in the first embodiment, the linking device 7 comprises a support 71, an input part 72, a transmission device 73, a first connecting link 74 and a second connecting link 75.

The support 71 is attached to the lumbar belt 2.

The input part 72 is connected to the mechanical back assembly 5. The input part 72 is mounted sliding with respect to the support 71 by means of a slider 711 and of a pin 721 capable of sliding inside the slider 711 and turning with respect to the slider 711.

In this second embodiment, the input part 72 has the general shape of an inverted T with a first branch 722 and a second branch 723. The first branch 722 has a first end 724 and the second branch 723 has a second end 725.

The transmission device 73 comprises a first pulley 76, a second pulley 77, a third pulley 86, a fourth pulley 87, a first cable 78, a second cable 79, a third cable 88 and a fourth cable 89.

The first pulley 76 is mounted in rotation on the support 71 around a first axis of rotation 763. The first pulley 76 comprises a first wheel 761 having two circumferential surfaces 762 and 764 having different radii. The radius of the circumferential surface 764 is less than the radius of the circumferential surface 762. The circumferential surface 762 can have a recess for receiving and guiding the first cable 78. The circumferential surface 764 can also have a recess for receiving and guiding the third cable 88.

The second pulley 77 is also mounted in rotation on the support 71 around a second axis of rotation 773. The second pulley 77 comprises a second wheel 771 also having two circumferential surface 772 and 774. The radius of the circumferential surface 774 is less than the radius of the circumferential surface 772. The circumferential surface 772 can have a recess for receiving and guiding the second cable 79. The fourth circumferential surface 764 can have a recess for receiving and guiding the fourth cable 89.

The first connecting link 74 is mounted in rotation with respect to the support 71. More precisely, the first connecting link 74 is mounted in rotation around an axis of rotation coincident with the axis of rotation 763 of the first pulley 76. The first connecting link 74 has a first end 741 connected to the input part 72 by means of the transmission device 73 and a second end 742 connected to the first hip joint 34 of the first mechanical leg assembly 3.

The second connecting link 75 is mounted in rotation with respect to the support 71. More precisely, the second connecting link 75 is mounted in rotation around an axis of rotation 753 coincident with the axis of rotation of the second pulley 77. The second connecting link 75 has a first end 751 connected to the input part 72 by means of the transmission device 73 and a second end 752 connected to the second hip joint 44 of the second mechanical leg assembly 4.

The first cable 78 connects the input part 72 to the first pulley 76 while supporting itself on the circumferential surface 762 of the first pulley 76. The third cable 88 connects the first pulley to the first connecting link 74, while supporting itself on the circumferential surface 764 of the first pulley 76 and on the circumferential surface 862 of the third pulley 86.

More precisely, the first cable 78 has a first end 781 attached to the first end 724 of the input part 72 and a second end 782 attached to the first circumferential surface 762 of the first pulley 76.

The third cable 88 has a first end 881 attached to the circumferential surface 764 of the first pulley 76 and a second end 882 attached to the first end 741 of the first connecting link 74.

Likewise, the second cable 79 connects the input part 72 to the second pulley 77 while supporting itself on the circumferential surface 772 of the second pulley 77. The fourth cable 89 connects the second pulley 77 to the second connecting link 75, while supporting itself on the circumferential surface 774 of the second pulley 77 and on the circumferential surface 872 of the fourth pulley 87.

More precisely, the second cable 79 has a first end 791 attached to the second end 725 of the input part 72 and a second end 792 attached to the circumferential surface 772 of the second pulley 77.

The fourth cable 89 has a first end 891 attached to the circumferential surface 774 of the second pulley 77 and a second end 892 attached to the first end 751 of the second connecting link 75.

As each pulley 76 (respectively 77) has two circumferential surfaces 762 and 764 (respectively 772 and 774) with different radii, the transmission device 73 allows the tension exerted by the first cable 78 (respectively the second cable 88) which is transmitted to the third cable 88 (respectively to the fourth cable 89) to be multiplied.

This configuration allows a particularly compact transmission device 73 to be obtained.

In operation, the rotation of the input part 72 in the first direction of rotation (arrow D) has the effect of extending the first cable 78. The first cable 78 transmits to the first pulley 76 a force tending to pivot the first pulley 76 with respect to the support part 71 in the first direction of rotation (arrow B) around its axis of rotation 763.

Rotation of the first pulley 76 in the first direction of rotation has the effect of winding the third cable 88 around the first pulley 76. However, as the radius of the circumferential surface 764 is less than the radius of the circumferential surface 762, the tension which is transmitted to the third cable 88 is greater than the tension exerted by the first cable 78.

Conversely, rotation of the input part 72 in the second direction of rotation (arrow E) has the effect of extending the second cable 79. The second cable 79 transmits to the second pulley 77 a force tending to pivot the second pulley 77 with respect to the support part 71 in the second direction of rotation (arrow C) around its axis of rotation 773.

Rotation of the second pulley 77 in the second direction of rotation has the effect of winding the fourth cable 89 around the second pulley 77. However, as the radius of the circumferential surface 774 is smaller than the radius of the circumferential surface 772, the tension transmitted to the fourth cable 89 is greater than the tension exerted by the second cable 79.

Just as in the first embodiment, during the walking cycle, the load is transferred alternately to the first mechanical leg assembly 3 and to the second mechanical leg assembly 4. Thanks to the proposed linking device 7, the load is always transferred to the mechanical leg assembly 3 or 4 which is in contact with the ground. The other mechanical leg assembly supports only a reduced fraction of the load so that the user can easily lift the corresponding leg.

The invention claimed is:

1. A linking device for an exoskeleton structure comprising:
   a support intended to be attached to a lumbar belt,
   an input part mounted in rotation with respect to the support and configured to be connected to a mechanical back assembly of the exoskeleton structure,
   a transmission device,
   a first connecting link mounted in rotation with respect to the support, the first connecting link having a first end connected to the input part by means of the transmission device and a second end configured to be connected to a first hip joint of a first mechanical leg assembly of the exoskeleton structure and
   a second connecting link mounted in rotation with respect to the support, the second connecting link having a first end connected to the input part by means of the transmission device and a second end configured to be connected to a second hip joint of a second mechanical leg assembly of the exoskeleton structure, the transmission device being arranged so that:
   when a load is applied to the input part tending to pivot the input part in a first direction of rotation with respect to the support, the transmission device transmits to the first connecting link a force tending to pivot the first connecting link to transfer the load to the first mechanical leg assembly and unload the second mechanical leg assembly of the exoskeleton structure and
   when a load is applied to the input part tending to pivot the input part in a second direction of rotation with respect to the support, opposite to the first direction of rotation, the transmission device transmits to the second connecting link a force tending to pivot the second connecting link to transfer the load to the second mechanical leg assembly and unload the first mechanical leg assembly of the exoskeleton structure.

2. The device according to claim 1, wherein the input part is slidingly mounted with respect to the support.

3. The device according to claim 2, the input part is slidingly mounted with respect to the support by means of a slider and of a cylindrical pin capable of sliding inside the slider and turning with respect to the slider.

4. The device according to claim 1, wherein the input part has a first branch having one end connected to the first connecting link by means of the transmission device and a second branch having one end connected to the second connecting link by means of the transmission device.

5. The device according to claim 1, wherein the transmission device is a pulley and cable device.

6. The device according to claim 1, wherein the transmission device comprises a first cable connecting the input part to the first end of the first connecting link and a second cable connecting the input part to the first end of the second connecting link.

7. The device according to claim 6, comprising a first pulley mounted in rotation on the support and in which the first cable connects the input part to the first end of the first connecting link while supporting itself on a circumferential surface of the first pulley.

8. The device according to claim 7, further comprising a second pulley mounted in rotation on the support, and wherein the second cable connects the input part to the first end of the second connecting link while supporting itself on a circumferential surface of the second pulley and the first pulley and the second pulley have coincident axes of rotation.

9. The device according to claim 6, comprising a second pulley mounted in rotation on the support, and wherein the second cable connects the input part to the first end of the second connecting link while supporting itself on a circumferential surface of the second pulley.

10. The device according to claim 1, wherein the transmission device comprises a first pulley mounted in rotation on the support, a first cable connecting the input part to the first pulley and a third cable connecting the first pulley to the first end of the first connecting link.

11. The device according to claim 10, wherein the first cable supports itself on a first circumferential surface of the first pulley and the third cable supports itself on a third circumferential surface of the first pulley, the third circumferential surface having a smaller radius than the radius of the first circumferential surface.

12. The device according to claim 10, wherein the transmission device comprises a second pulley mounted in rotation on the support, a second cable connecting the input part to the second pulley and a fourth cable connecting the second pulley to the first end of the second connecting rod.

13. The device according to claim 12, wherein the second cable supports itself on a second circumferential surface of the second pulley and the fourth cable supports itself on a fourth circumferential surface of the second pulley, the fourth circumferential surface having a smaller radius than the radius of the second circumferential surface.

14. The device according to claim 12, wherein the first pulley and/or the second pulley has an axis of rotation coincident with the axis of rotation of the first connecting link and/or of the second connecting link.

15. An exoskeleton structure comprising:
- a lumbar belt configured to surround the waist of a user,
- a first mechanical leg assembly configured to extend along a first leg of the user,
- a second mechanical leg assembly configured to extend along a second leg of the user,
- a mechanical back assembly configured to extend along the back of the user for carrying a load,
- a linking device according to claim 1, of which the input part is connected to the back assembly, the support is attached to the lumbar belt, the first connecting link has its second end connected to the first mechanical leg assembly via a first hip joint and the second connecting link has its second end connected to the second mechanical leg assembly via a second hip joint.

* * * * *